(12) United States Patent
Uan-Zo-Li et al.

(10) Patent No.: US 9,612,643 B2
(45) Date of Patent: Apr. 4, 2017

(54) CONTROLLING THE CPU SLEW RATES BASED ON THE BATTERY STATE OF CHARGE

(71) Applicant: Intel Corporation, Santa Clara, CA (US)

(72) Inventors: Alexander B. Uan-Zo-Li, Hillsboro, OR (US); Don J. Nguyen, Portland, OR (US); Gang Ji, Santa Clara, CA (US); Philip R. Lehwalder, Hillsboro, OR (US); Jorge P. Rodriguez, Portland, OR (US); Vasudevan Srinivasan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 14/229,864

(22) Filed: Mar. 29, 2014

(65) Prior Publication Data

US 2015/0277535 A1 Oct. 1, 2015

(51) Int. Cl.
G06F 1/32 (2006.01)
(52) U.S. Cl.
CPC ............ *G06F 1/3234* (2013.01); *G06F 1/324* (2013.01)
(58) Field of Classification Search
None
See application file for complete search history.

(56) References Cited

U.S. PATENT DOCUMENTS

| 5,781,784 | A | * | 7/1998 | McKinley | ............ G06F 1/3203 |
| | | | | | 365/227 |
| 6,009,488 | A | | 12/1999 | Kavipurapu | |
| 6,484,265 | B2 | * | 11/2002 | Borkar | ...................... G06F 1/26 |
| | | | | | 327/544 |
| 7,698,575 | B2 | | 4/2010 | Samson | |
| 7,769,883 | B2 | | 8/2010 | Harriman | |
| 7,949,794 | B2 | | 5/2011 | Ajanovic et al. | |
| 8,218,580 | B2 | | 7/2012 | Harriman | |
| 8,437,343 | B1 | | 5/2013 | Wagh et al. | |
| 8,446,903 | B1 | | 5/2013 | Ranganathan et al. | |
| 8,549,205 | B1 | | 10/2013 | Harriman et al. | |
| 8,629,649 | B2 | | 1/2014 | Guo et al. | |
| 8,972,640 | B2 | | 3/2015 | Wagh | |
| 9,261,934 | B2 | | 2/2016 | Uan-Zo-Li | |

(Continued)

FOREIGN PATENT DOCUMENTS

CN 1838503 A 9/2006
TW 489564 6/2002

(Continued)

OTHER PUBLICATIONS

Non-Final Rejection received for U.S. Appl. No. 13/630,846, mailed on Sep. 15, 2014.

(Continued)

*Primary Examiner* — Paul Yanchus, III
(74) *Attorney, Agent, or Firm* — Alpine Technology Law Group LLC (57) ABSTRACT

Methods and apparatus relating to controlling processor slew rates based on battery charge state/level are described. In one embodiment, logic causes modification to a slew rate of a processor based on at least a charge level of a battery pack. Other embodiments are also disclosed and claimed.

24 Claims, 10 Drawing Sheets

(56) References Cited

U.S. PATENT DOCUMENTS

| | | | |
|---|---|---|---|
| 2006/0023633 | A1 | 2/2006 | Caruk et al. |
| 2006/0184809 | A1 | 8/2006 | Kojou et al. |
| 2006/0187689 | A1 | 8/2006 | Hartular |
| 2006/0256989 | A1 | 11/2006 | Olsen et al. |
| 2007/0174586 | A1* | 7/2007 | Tell ............ G06F 1/10 712/1 |
| 2008/0065796 | A1 | 3/2008 | Lee et al. |
| 2008/0109565 | A1 | 5/2008 | Ajanovic et al. |
| 2008/0233912 | A1 | 9/2008 | Hunsaker et al. |
| 2008/0235528 | A1 | 9/2008 | Kim et al. |
| 2008/0294831 | A1 | 11/2008 | Mao |
| 2009/0106476 | A1 | 4/2009 | Jenkins et al. |
| 2009/0121644 | A1* | 5/2009 | Sandner ............ H05B 33/0812 315/241 P |
| 2009/0141654 | A1 | 6/2009 | Voutilainen et al. |
| 2010/0014541 | A1 | 1/2010 | Harriman |
| 2010/0081406 | A1 | 4/2010 | Tan et al. |
| 2010/0123435 | A1 | 5/2010 | Piazza et al. |
| 2010/0325463 | A1 | 12/2010 | Lindsay |
| 2010/0332868 | A1 | 12/2010 | Tan et al. |
| 2011/0060931 | A1 | 3/2011 | Radhakrishnan et al. |
| 2011/0066771 | A1 | 3/2011 | Renaud et al. |
| 2011/0138197 | A1 | 6/2011 | Lakshmanan et al. |
| 2012/0021807 | A1 | 1/2012 | Book et al. |
| 2012/0054504 | A1 | 3/2012 | Kung |
| 2012/0120959 | A1 | 5/2012 | Krause |
| 2012/0197341 | A1 | 8/2012 | Cowley et al. |
| 2013/0088203 | A1 | 4/2013 | Solie |
| 2013/0307464 | A1 | 11/2013 | Zhu |
| 2014/0006670 | A1 | 1/2014 | Wagh |
| 2014/0095897 | A1 | 4/2014 | Ji et al. |
| 2014/0281591 | A1 | 9/2014 | Uan-Zo-Li |

FOREIGN PATENT DOCUMENTS

| | | |
|---|---|---|
| TW | M427729 U1 | 4/2012 |
| TW | 201304351 A | 1/2013 |
| WO | 2013-147874 A1 | 10/2013 |
| WO | 2014/052119 A1 | 4/2014 |

OTHER PUBLICATIONS

Final Rejection received for U.S. Appl. No. 13/630,846, mailed on Jan. 15, 2015.
Notice of Allowance received for U.S. Appl. No. 13/630,846, mailed on Jun. 3, 2015.
Notice of Allowance received for Taiwanese Patent Application No. 103107445, dated Nov. 27, 2015, with 5 pages of the allowed English claims.
Office Action and Search Report received for Taiwanese Patent Application No. 103107445, mailed on Jul. 29, 2015, 16 pages including 7 pages of English translation.
Office Action issued in U.S. Appl. No. 13/477,304, mailed on Mar. 22, 2013.
Office Action issued in U.S. Appl. No. 13/477,310 mailed on Aug. 14, 2012.
Office Action issued in U.S. Appl. No. 13/477,304, mailed on Sep. 20, 2012.
Intel Corporation, "An Introduction to the Intel Quick Path Interconnect", Jan. 2009, pp. 1-22.
MIPI Alliance, "Physical layer Specifications: MIPI Alliance Launches M-PHY v1.0 + Uni Pro v1.40 Specifications", 2011, 1 page.
MIPI Alliance "MIPI Alliance launches New M-PHY and UniPro Specifications for Mobile Device Application", Jun. 10, 2011, 2 pages.
Office Action issued U.S. Appl. No. 13/477,322 mailed on Aug. 7, 2012.
"Smartphone in next stop for PCI Express" from www.eetimes.com; published Sep. 13, 2012, 2 pages.
"Spec turns USB3 into chip link" from www.eetimes.com; published May 3, 2011, 2 pages.
"M-PHY benefits and challenges" from www.eetimes.com; published Apr. 11, 2011, 8 pages.
"PCIe Over M-PHY May Bring High-Speed I/O to Tables, Smartphones" from www.pcmag.com; published Sep. 13, 2012.
"Integrated Circuit", Feb. 2, 2005, Wikipedia.
Notice of Allowance received for U.S. Appl. No. 13/839,197, mailed on Oct. 7, 2015.
Non-Final Office Action received for U.S. Appl. No. 13/839,197, mailed on Apr. 3, 2015.
International Search Report received for International Application No. PCT/US2013/060394, mailed on Dec. 27, 2013.
Office Action and Search Report received for Taiwanese Patent Application No. 104105093, mailed on Feb. 22, 2016, 6 pages including 1 page of English translation.
Notice of Allowance received for Taiwanese Patent Application No. 104105093, mailed on Oct. 14, 2016, 6 pages including 1 page of English translation of the Notice of Allowance and 3 pages of allowed claims in English.

* cited by examiner

CONTROLLING THE CPU SLEW RATES BASED ON THE BATTERY STATE OF CHARGE

FIELD

The present disclosure generally relates to the field of electronics. More particularly, an embodiment relates to controlling processor slew rates based on battery charge state.

BACKGROUND

To reduce power consumption, some systems include processors with the ability to perform at various low power (Cx) or idle states. Each C state may indicate a certain level of functionality and a corresponding power state. For example, C0 may indicate the processor is operating at normal levels, C1 may indicate the processor is not executing instructions but may return to an executing state quickly, etc.

However, as the need for more power efficient systems arises, e.g., to allow for all day operation using battery power from a single charge, such coarse power reduction solutions that are solely based on processor states may fall short.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Success of mobile computing devices (such as Ultrabook™ computers) may ultimately depends on two things—whether manufacturers/designers can provide excellent performance and whether it is possible to extend the battery life. The second requirement may be at least partially solved by changing the battery pack from a traditional 3S2P configuration (3 cells Series, 2 Parallel) to a 2S3P configuration (2 cells Series, 3 Parallel). As a result of this change, the system voltage is lowered from about 9V-12.6V to about 6V-8.4V (the range is given for different levels of remaining battery state of charge). The consequence of lowered system voltage is a better efficiency of Voltage Regulators (VRs) both at heavy load and light load. A system with such a battery configuration can much more easily satisfy requirements on battery runtime (e.g., for Microsoft Windows® 8). However, one negative consequence of lowering the system voltage is a risk of the system shutdown, e.g., when the battery has little remaining charge and the system power requirements are high enough to cause a considerable droop of the system voltage.

To this end, some embodiments control processor slew rates based on battery charge state. As discussed herein, "slew rate" generally refers to the maximum rate of change of output voltage per unit of time (e.g., expressed as volt per second). In one embodiment, the slew rate of a processor (or CPU (Central Processing Unit)) are modulated based on battery charge state of the platform. In an embodiment, the slew rate modulation is applied in combination with limiting the processor Iccmax based on the battery charge state. As discussed herein, "Iccmax" generally refers to the maximum processor current (or in other terms, the maximum processor power consumption), which is a function of the maximum processor clock frequency. Moreover, such embodiments may provide better performance in battery mode, while also improving the battery run time, e.g., particularly in connected standby (e.g., where a computing device is in a lower power consumption state than an active state while still maintaining an active network connection, and also the system optionally wakes up periodically to execute required tasks).

Figure 1:
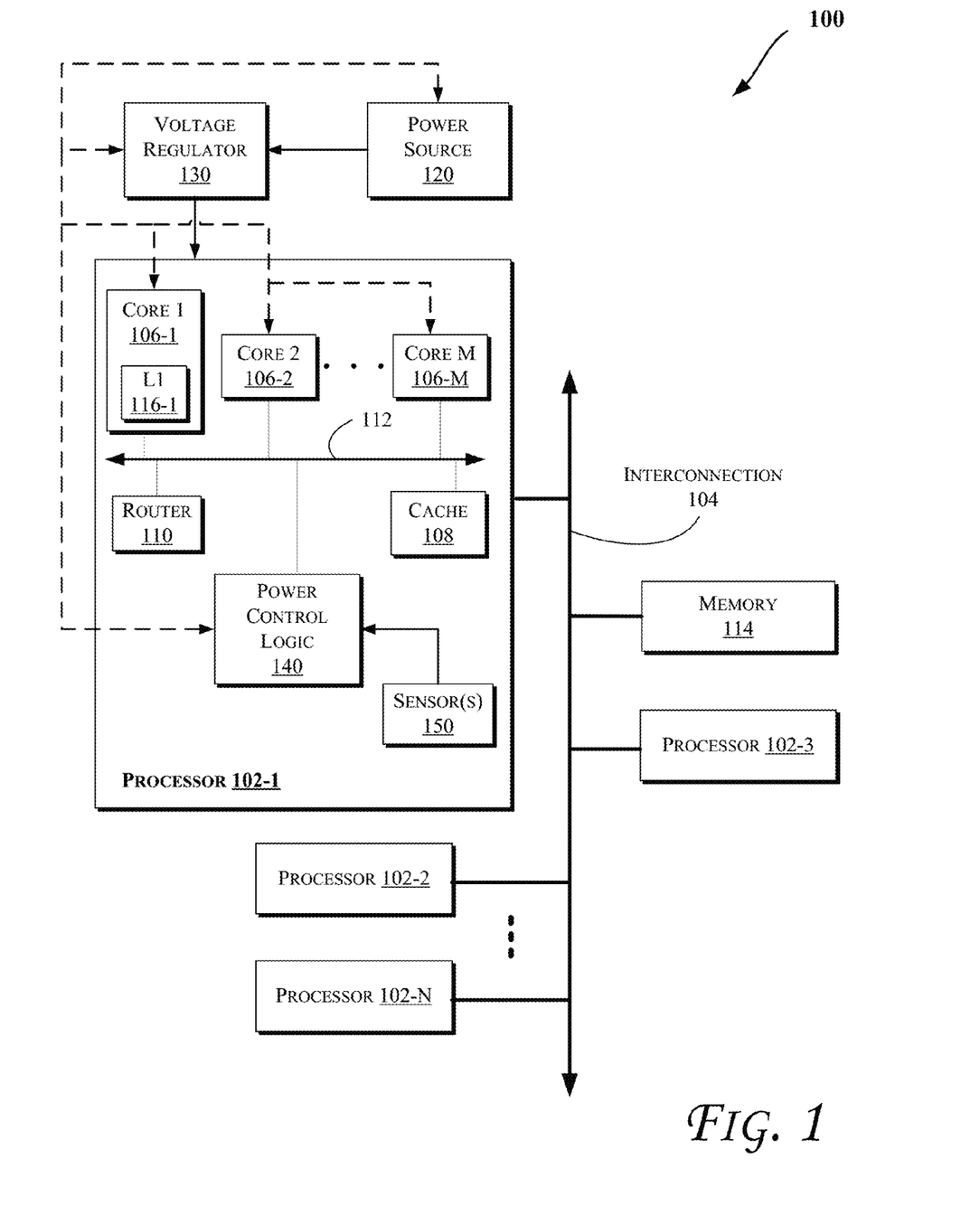
FIGS. 1 and 8-10 illustrate block diagrams of embodiments of computing systems, which may be utilized to implement various embodiments discussed herein.

Moreover, some embodiments may be applied in computing systems that include one or more processors (e.g., with one or more processor cores), such as those discussed with reference to FIGS. 1-10 including, including for example mobile computing devices such as a smartphone, tablet, UMPC (Ultra-Mobile Personal Computer), laptop computer, Ultrabook™ computing device, smart watch, smart glasses, wearable devices, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIGS. 8-10), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a direct current (DC) power source or an alternating current (AC) power source) to provide power to one or more components of the system 100. In some embodiments, the power source 120 may include one or more battery packs and/or power supplies. The power source 120 may be coupled to components of system 100 through a voltage regulator (VR) 130. Moreover, even though FIG. 1 illustrates one power source 120 and one voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 to control supply of power to components of the processor 102 (e.g., cores 106). Logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120.

Figure 3:
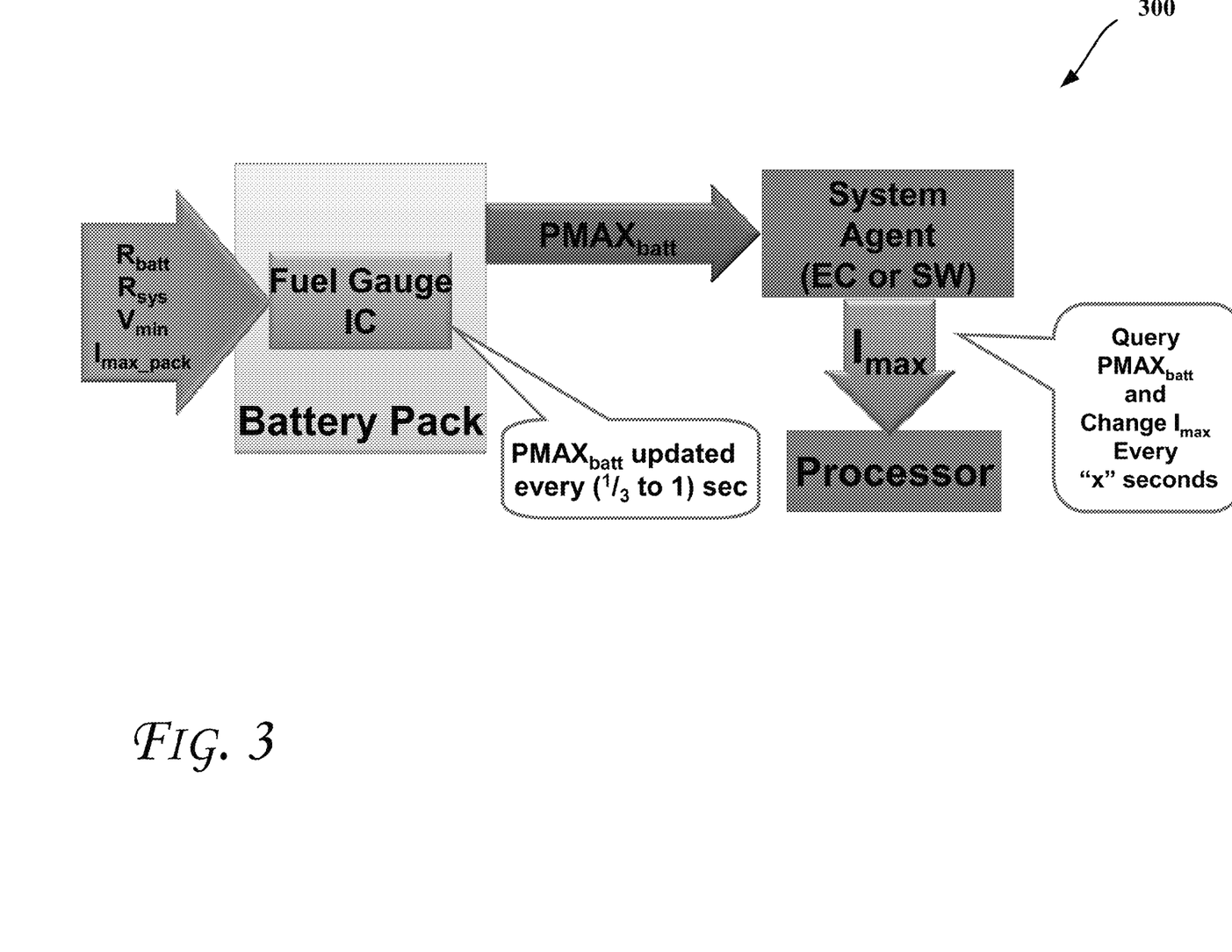
FIGS. 3 and 6 illustrate block diagrams for dynamic battery power systems, according to some embodiments.

For example, the logic 140 may be coupled to receive information (e.g., in the form of one or more bits or signals) to indicate status of one or more sensors 150 and/or battery charge levels (such as from fuel gauge logic of FIGS. 3 and/or 6). The sensor(s) 150 may be provided proximate to component(s) of system 100 (or other computing systems discussed herein such as those discussed with reference to other figures including 8-10, for example), such as the cores 106, interconnections 104 or 112, components outside of the processor 102, battery charge states/levels, etc., to sense variations in various factors affecting power/thermal behavior of the system/platform, such as temperature, operating frequency, operating current, operating voltage, power consumption, and/or inter-core communication activity, overcurrent, etc.

The logic 140 may in turn instruct the VR 130, power source 120, and/or individual components of system 100 (such as the cores 106) to modify their operations. For example, logic 140 may indicate to the VR 130 and/or power source 120 to adjust their output. In some embodiments, logic 140 may request the cores 106 to modify their slew rate, operating frequency, operating current, power consumption, etc. Also, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, etc. Furthermore, as shown in FIG. 1, the power source 120 and/or the voltage regulator 130 may communicate with the power control logic 140, e.g., to report their power related specifications and/or status.

Figure 2:
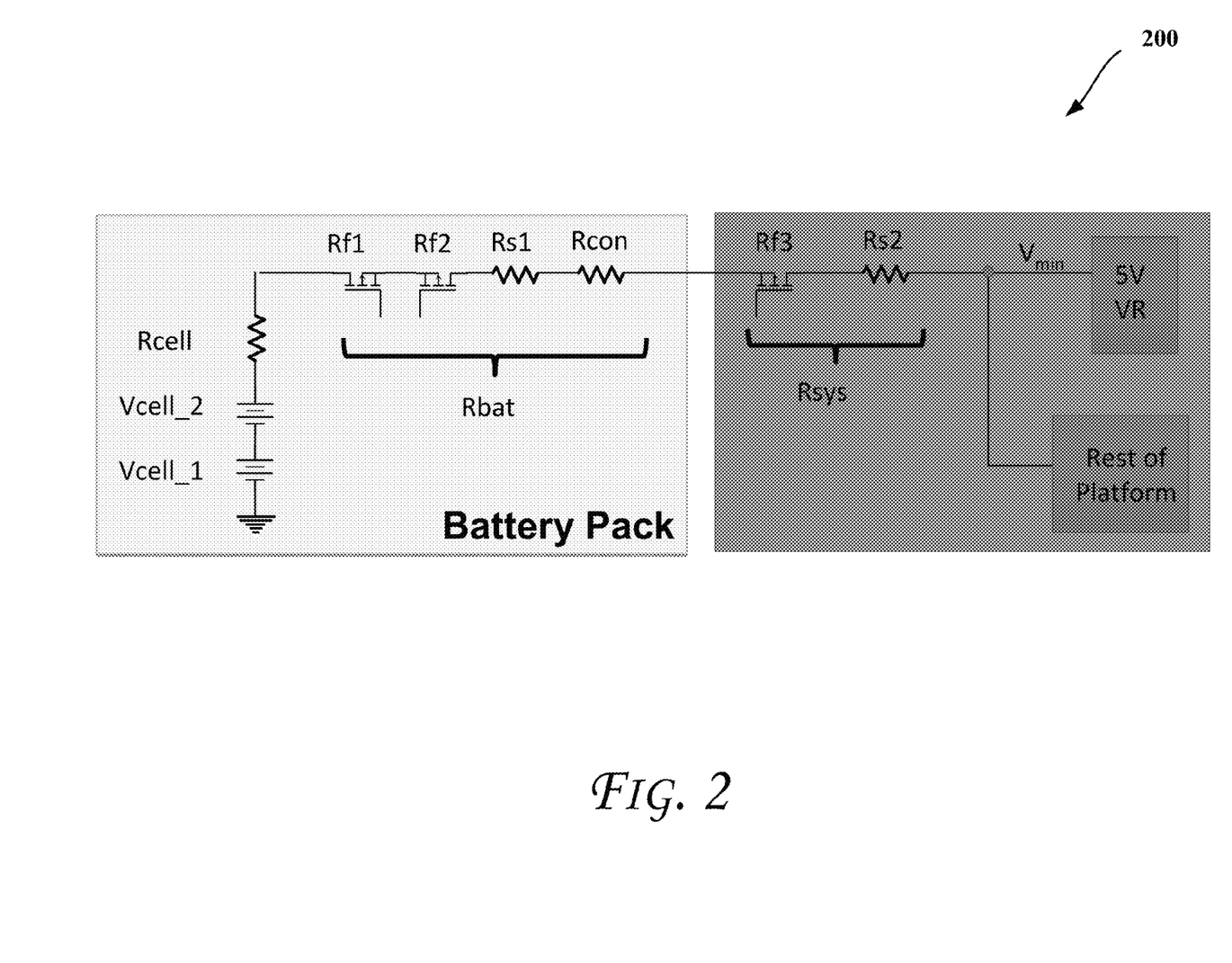
FIG. 2 shows a block diagram of power delivery system, according to an embodiment.

FIG. 2 shows a block diagram of power delivery system 200, according to an embodiment. The current from the battery cells pass through the cell resistance Rcell, two pass-FETs (Field Effect Transistors) with resistance Rf1 and Rf2, sense resistor Rs1, connector resistor Rcon (which are on the battery side), the pass FET with resistance Rf3 and sense resistor Rs2 (which are on the platform side). The system voltage is then used by one or more platform VRs to supply different rails with specified voltages. The VR which supplies the 5V rail requires that its input voltage is at least 5.6V (could be lower or higher dependent on the implementation of the VR), and if the input voltage droops below that value, the 5V rail may be out of specification, and the system may crash or shut down.

FIG. 3 shows a block diagram for a dynamic battery power system 300, according to an embodiment. In one embodiment, a processor's maximum turbo level (Iccmax) is adjusted based on the battery maximum output power capability with the respect to the minimum system input voltage and is dependent on the remaining state of charge of the batteries as well as battery and system impedance. As discussed herein, a "turbo" mode refers to a mode where one or more components (such as a processor) are driven harder for periods ranging, e.g., from hundreds of microseconds to tens of seconds. The fuel gauge IC (Integrated Circuit) monitors the battery state of charge, its output voltage and impedance, and calculates the maximum power (Pmax) that the battery can deliver to the platform while the system voltage is at or higher than the minimum system voltage. System agent logic (e.g., including EC (Embedded Controller) and/or software) will report the Pmax to the processor, and the processor will adjust the processor Imax (maximum current) based on Pmax (as well as the rest of the platform power consumption).

Figure 4:
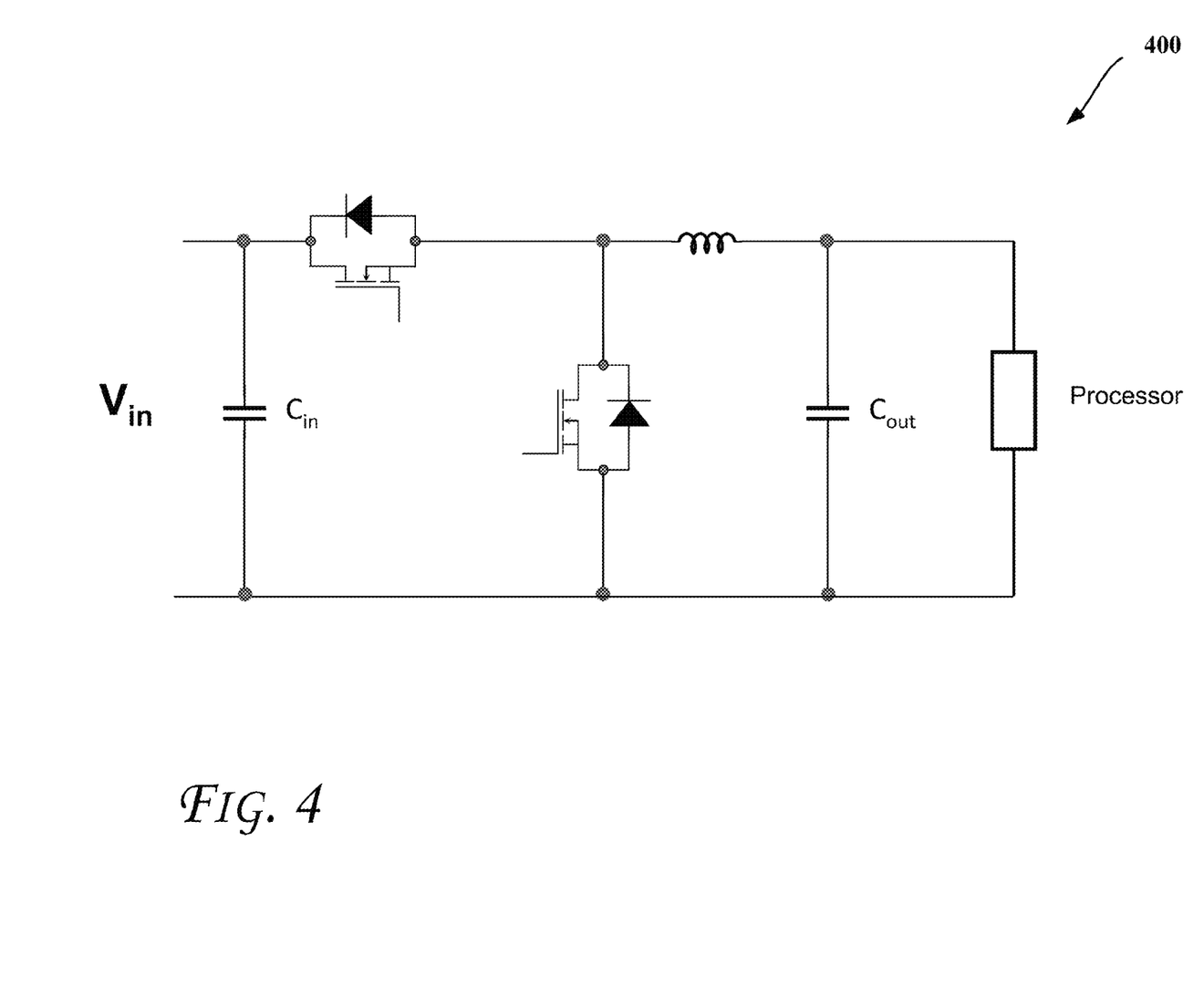
FIG. 4 illustrates a circuit diagram of a buck regulator supplied by battery power, according to an embodiment.

Moreover, during the ramping up of the processor voltage, the processor power consumption or the power consumption of the processor VR can also spike. To demonstrate this effect, a sample simulation may be run for a buck regulator supplied by the battery power (such as shown in FIG. 4 according to an embodiment), with the following parameters: (a) battery voltage: Vbat=6V; (b) battery resistance Rbat=100 mOhm; (c) battery parasitic inductance Lbat=3 nH; and (d) VR input decoupling C=100 uF. The VR inductor is 500 nH, and output decoupling is assembled of 23 capacitors, 22 uF each. In order to satisfy the existing required processor slew rate, the current consumed by the system is rising from 0 A to 9.6 A in 37.5 us.

Figure 5A:
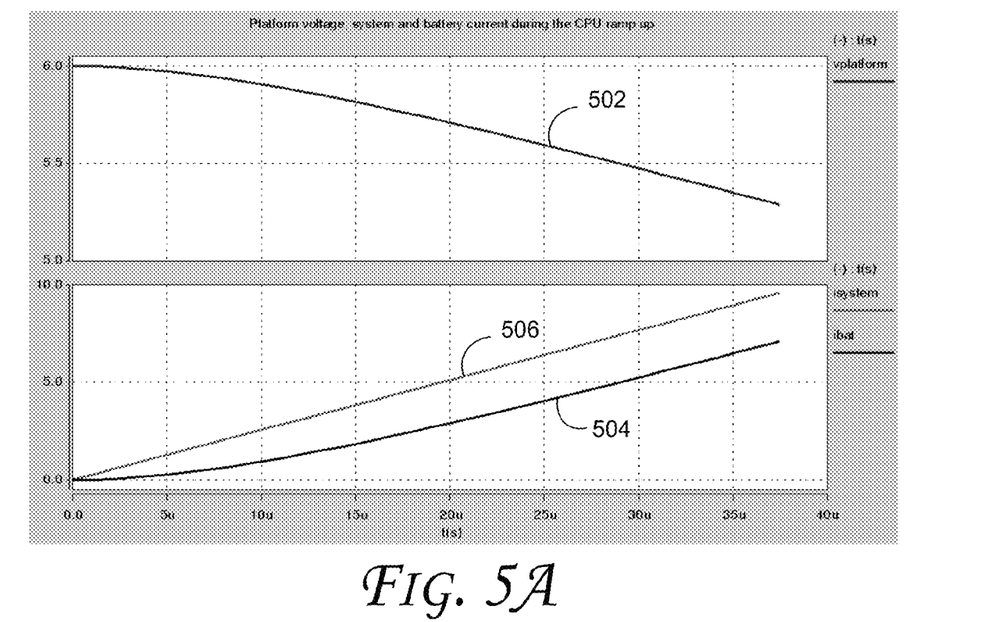
FIGS. 5A and 5B illustrate graphs of sample waveforms, according to some embodiments.
Figure 5B:
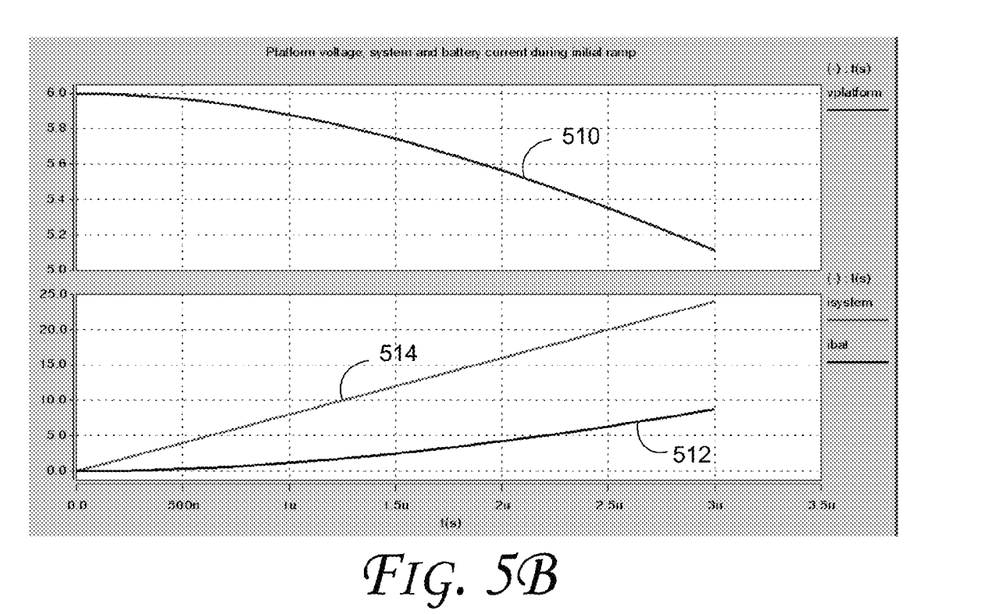

FIGS. 5A and 5B illustrate graphs of sample waveforms, according to some embodiments. More particularly, FIG. 5A shows the resulting simulated waveforms, according to an embodiment. The platform voltage (the curve on the top 502), total average system current (middle curve 506), and the battery current (bottom curve 504) are shown as a function of time. The VR output voltage rises from 0V to 1.8V with a slew rate of 48 mV/us, and the input system current rises from 0 A to 9.6 A. The battery current is slightly smaller because of input decoupling and it rises from 0 A to 6.5 A. Total power from the battery reaches nearly 40 W. A real platform may have additional 15 W to supply rest of platform, which would result in 55 W battery output power. The numbers for a real system may be somewhat larger because of the switching nature of the VR input current. Also, if there is some delay in the slew rate, then the system current will be even larger because the VR would need to "catch up" in order to satisfy the 48 mV/us slew rate. As can be seen, the system input voltage quickly droops from 6V to 5.3V.

FIG. 5B shows the platform voltage (curve 510 on the top), total average system current (curve 514) and the battery current (curve 512) as a function of time when the VR output current is ramping up from 0 A to 9.6 A. In this case, the battery current spikes to nearly 6 A, which translates in 60 W delivered to the core VR. Total battery power then becomes 75 W, assuming 15 W consumed by the rest of the platform. As can be seen, the system input voltage quickly droops from 6V to 5.1V. As can be seen, the system voltage drooping to 5.3V (let alone 5.1V) will most likely result in the system shut down because a traditional 5V regulator will be unable to stay within the specifications. To this end, some embodiments will protect the system from an inadvertent shut down during the processor voltage ramp up as discussed herein.

Figure 6:
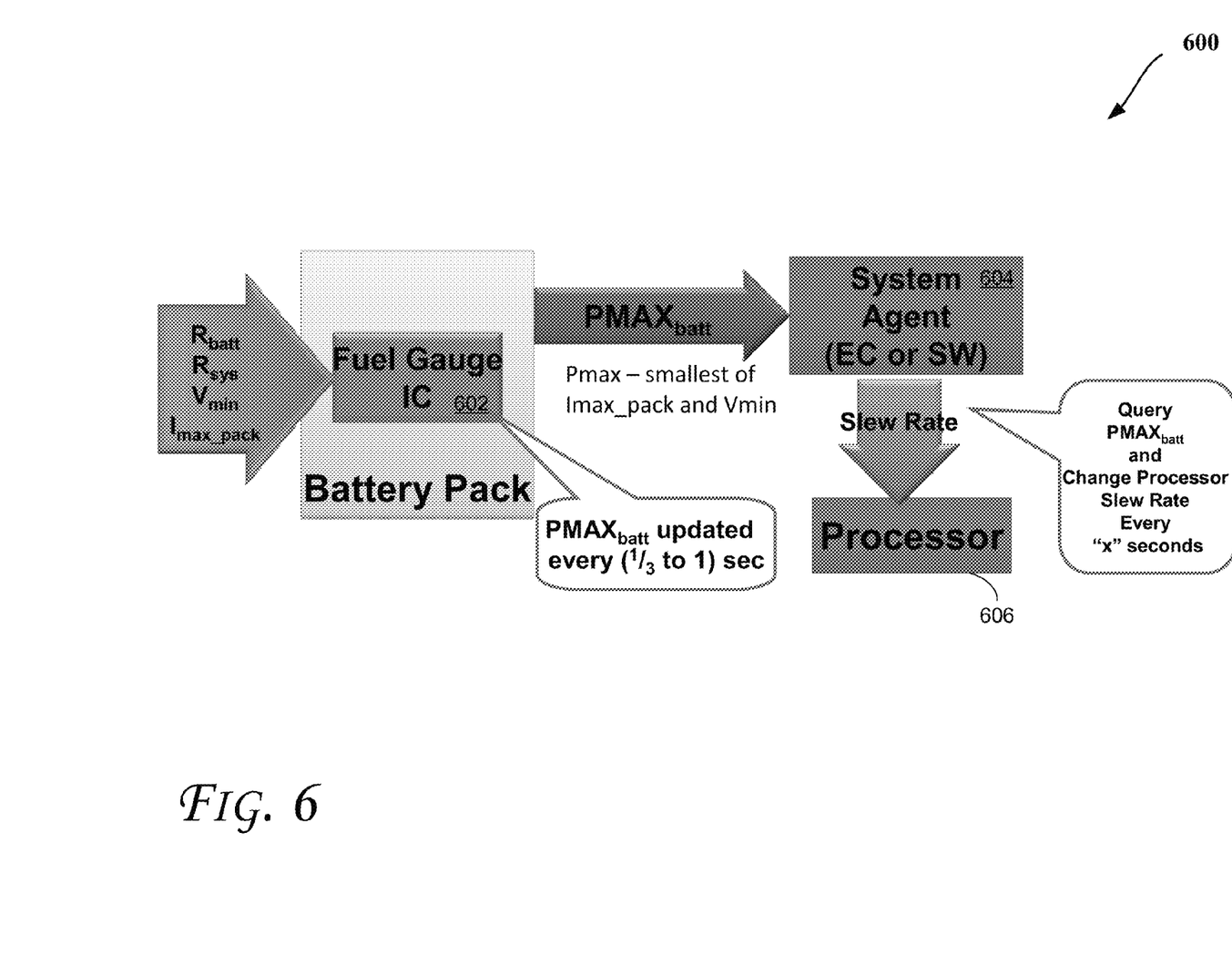

FIG. 6 shows a block diagram for a dynamic battery power system 600, according to an embodiment. FIG. 6 shows a system that prevents an inadvertent system shutdown due to fast processor ramp up (e.g., and the 5V VR shutdown). The fuel gauge logic 602 is expected to report maximum power (Pmax or $PMAX_{batt}$) that the battery can supply based on two conditions: (1) minimum input voltage to the platform (Vmin); and/or (2) maximum output current of the battery cells/pack (Imax_pack). As shown in FIGS. 3 and 6, $PMAX_{batt}$ is updated every ⅓ to 1 second in some embodiments in normal operation and may be updated less frequently in the off-mode, or more frequently if required by the EC.

Furthermore, firmware/logic may be used to allow for accurate and timely calculation of Pmax based on system Vmin and the system—battery-resistance. For example, the fuel gauge logic 602 estimates the battery resistance, which can change due to different levels of battery charge, different battery temperature, wear-out, etc. The fuel gauge logic 602 uses the estimated battery resistance value to estimate the power that would lead to the voltage droop large enough to lower the system voltage to Vmin (which may be a pre-programmed value, e.g., by a customer or OEM (Original Equipment Manufacturer) or the battery pack supplier. The minimum Pmax of the two calculations/determinations (based on minimum voltage and the maximum output current of the battery cells) will be reported to the system agent 604 (e.g., implemented as logic such as EC or software) to cause adjustment to slew rate of the processor 606 based on the battery charge state/level.

Figure 7:
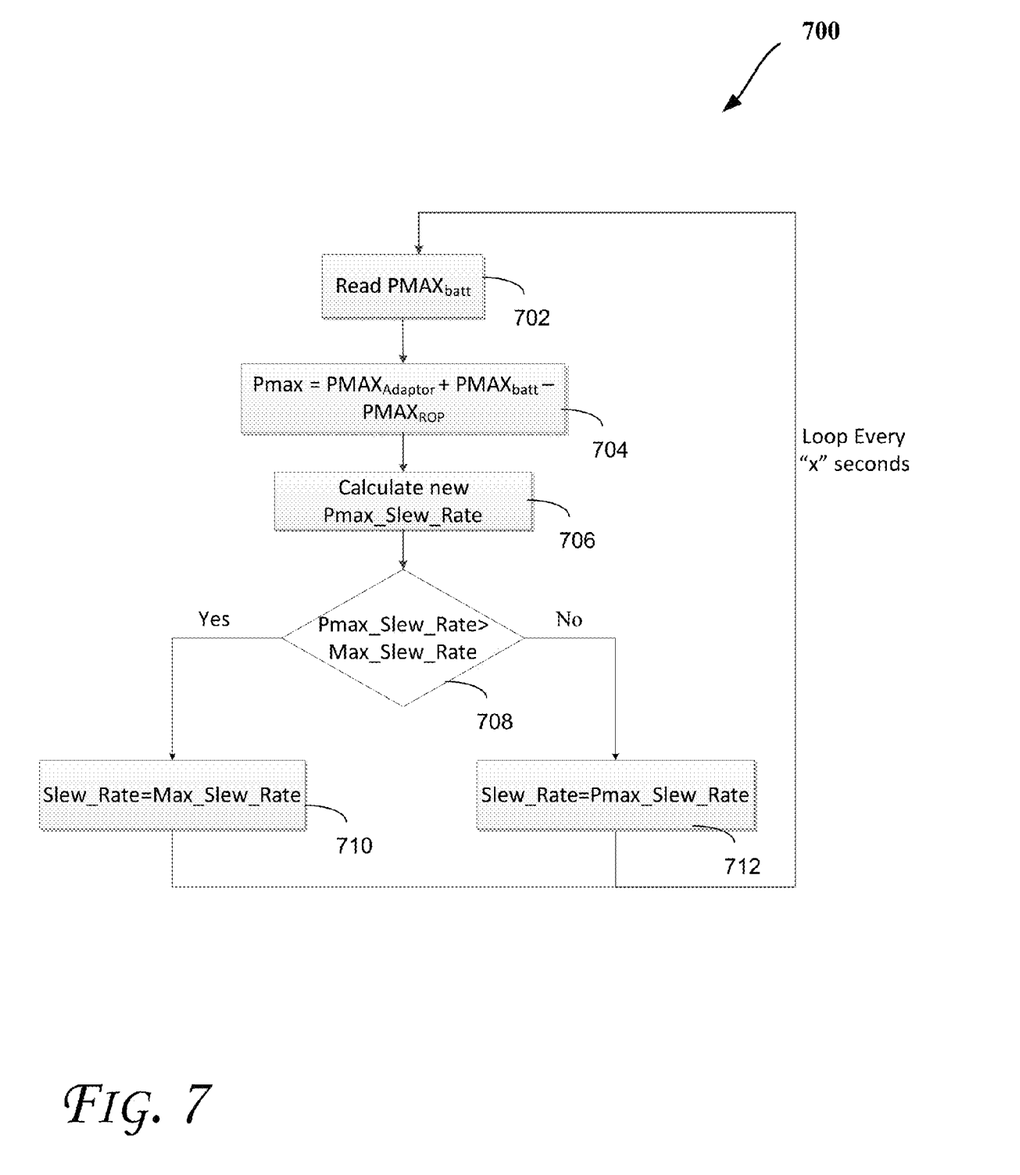
FIG. 7 illustrates a flow diagram of a method to control processor slew rate based on battery charge state, according to an embodiment.

FIG. 7 illustrates a flow diagram of a method 700 (e.g., for the system of FIG. 6) to control processor slew rate based on battery charge state, according to an embodiment. In an embodiment, various components (including for example logic 140, system agent 604, and/or fuel gauge logic 602) discussed with reference to FIGS. 1-6 and 8-10 may be utilized to perform one or more of the operations discussed with reference to FIG. 7.

Referring to FIGS. 6-7, at an operation 702, the $PMAX_{batt}$ is read/determined (e.g., by the fuel gauge logic 602). At an operation 704, Pmax, the maximum power available for the SOC is determined based on the maximum AC adapter power $PMAX_{adaptor}$ (for the case when the AC adapter is connected to the platform), maximum power of the battery ($PMAX_{batt}$) and maximum power consumption of the Rest of the Platform ($PMAX_{ROP}$). At an operation 706, the new/updated Pmax slew rate is calculated (e.g., by system agent 604 and/or logic 140) as discussed with reference to FIG. 6. Operation 708 determines whether the Pmax slew rate exceeds the maximum slew rate allowed. If so, operation 710 sets the processor slew rate to the maximum allowed slew rate; otherwise, the slew rate is set to the Pmax slew rate at operation 712. The loop (operations 702-710/712) are repeated every "x" number of seconds (which is configurable, e.g., by users and/or OEM customers).

Accordingly, based on the Pmax value, the processor 606 will set its maximum slew rate (per information from the system agent 604 which may be the same or similar to logic 140 in some embodiments). During the state transition, initial booting and the like, the processor will set the VR output voltage slew rate at or below the maximum rate calculated based on the maximum power which can be delivered by the battery without excessive battery wear-out or without the system shut-down due to system voltage drooping below the minimum. Such embodiments may be implemented by processor manufactures (e.g., via logic such as in their software code or firmware code in the EC). The end/OEM customers may use it on their own with or without help from the processor manufacturers.

Figure 8:
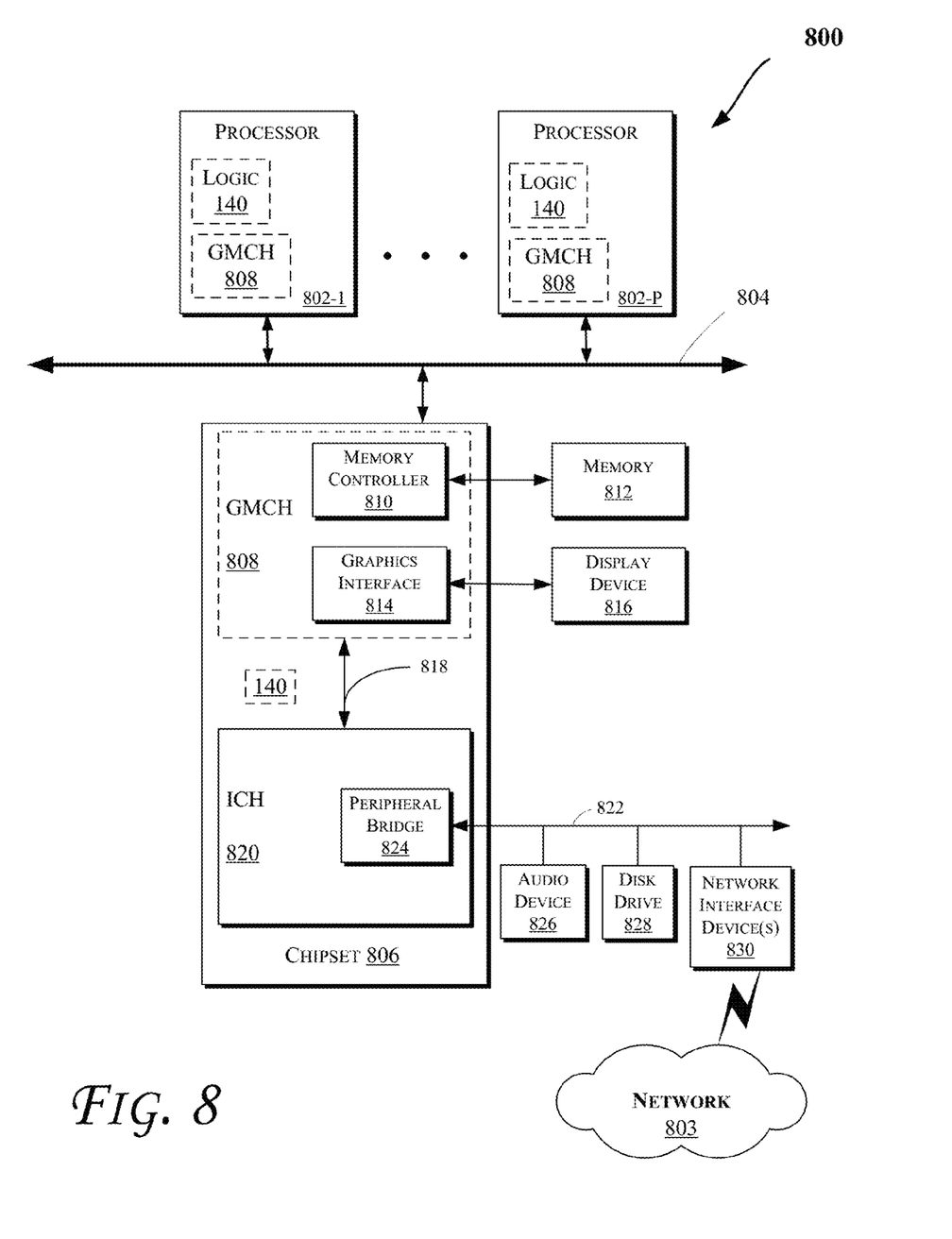

FIG. 8 illustrates a block diagram of a computing system 800 in accordance with an embodiment. The computing system 800 may include one or more central processing unit(s) (CPUs) or processors 802-1 through 802-P (which may be referred to herein as "processors 802" or "processor 802"). The processors 802 may communicate via an interconnection network (or bus) 804. The processors 802 may include a general purpose processor, a network processor (that processes data communicated over a computer network 803), or other types of a processor (including a reduced instruction set computer (RISC) processor or a complex instruction set computer (CISC)).

Moreover, the processors 802 may have a single or multiple core design. The processors 802 with a multiple core design may integrate different types of processor cores on the same integrated circuit (IC) die. Also, the processors 802 with a multiple core design may be implemented as symmetrical or asymmetrical multiprocessors. In an embodiment, one or more of the processors 802 may be the same or similar to the processors 102 of FIG. 1. In some embodiments, one or more of the processors 802 may include one or more of the cores 106, logic 140, and sensor(s) 150, of FIG. 1. Also, the operations discussed with reference to FIGS. 1-7 may be performed by one or more components of the system 800. For example, a voltage regulator (such as VR 130 of FIG. 1) may regulate voltage supplied to one or more components of FIG. 8 at the direction of logic 140 (which may also control boost mode initiation).

A chipset 806 may also communicate with the interconnection network 804. The chipset 806 may include a graphics and memory control hub (GMCH) 808. The GMCH 808 may include a memory controller 810 that communicates with a memory 812. The memory 812 may store data, including sequences of instructions that are executed by the processor 802, or any other device included in the computing system 800. In one embodiment, the memory 812 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 804, such as multiple CPUs and/or multiple system memories.

The GMCH 808 may also include a graphics interface 814 that communicates with a display device 816. In one embodiment, the graphics interface 814 may communicate with the display device 816 via an accelerated graphics port (AGP) or Peripheral Component Interconnect (PCI) (or PCI express (PCIe) interface). In an embodiment, the display 816 (such as a flat panel display, a cathode ray tube (CRT), a projection screen, etc.) may communicate with the graphics interface 814 through, for example, a signal converter that translates a digital representation of an image stored in a storage device such as video memory or system memory into display signals that are interpreted and displayed by the display device 618. The display signals produced may pass through various control devices before being interpreted by and subsequently displayed on the display device 450.

A hub interface 818 may allow the GMCH 808 and an input/output control hub (ICH) 820 to communicate. The ICH 820 may provide an interface to I/O devices that communicate with the computing system 800. The ICH 820 may communicate with a bus 822 through a peripheral bridge (or controller) 824, such as a peripheral component interconnect (PCI) bridge, a universal serial bus (USB) controller, or other types of peripheral bridges or controllers. The bridge 824 may provide a data path between the processor 802 and peripheral devices. Other types of topologies may be utilized. Also, multiple buses may communicate with the ICH 820, e.g., through multiple bridges or controllers. Moreover, other peripherals in communication with the ICH 820 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 822 may communicate with an audio device 826, one or more disk drive(s) 828, and one or more network interface device(s) 830 (which is in communication with the computer network 803). Other devices may communicate via the bus 822. Also, various components (such as the network interface device 830) may communicate with the GMCH 808 in some embodiments. In addition, the processor 802 and the GMCH 808 may be combined to form a single chip. Furthermore, a graphics accelerator (e.g., AGP and/or PCI/PCIe graphics device) may be included within the GMCH 808 in other embodiments.

Furthermore, the computing system 800 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 828), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 800 may be arranged in a point-to-point (PtP) configuration. For example, processors, memory, and/or input/output devices may be interconnected by a number of point-to-point interfaces.

Figure 9:
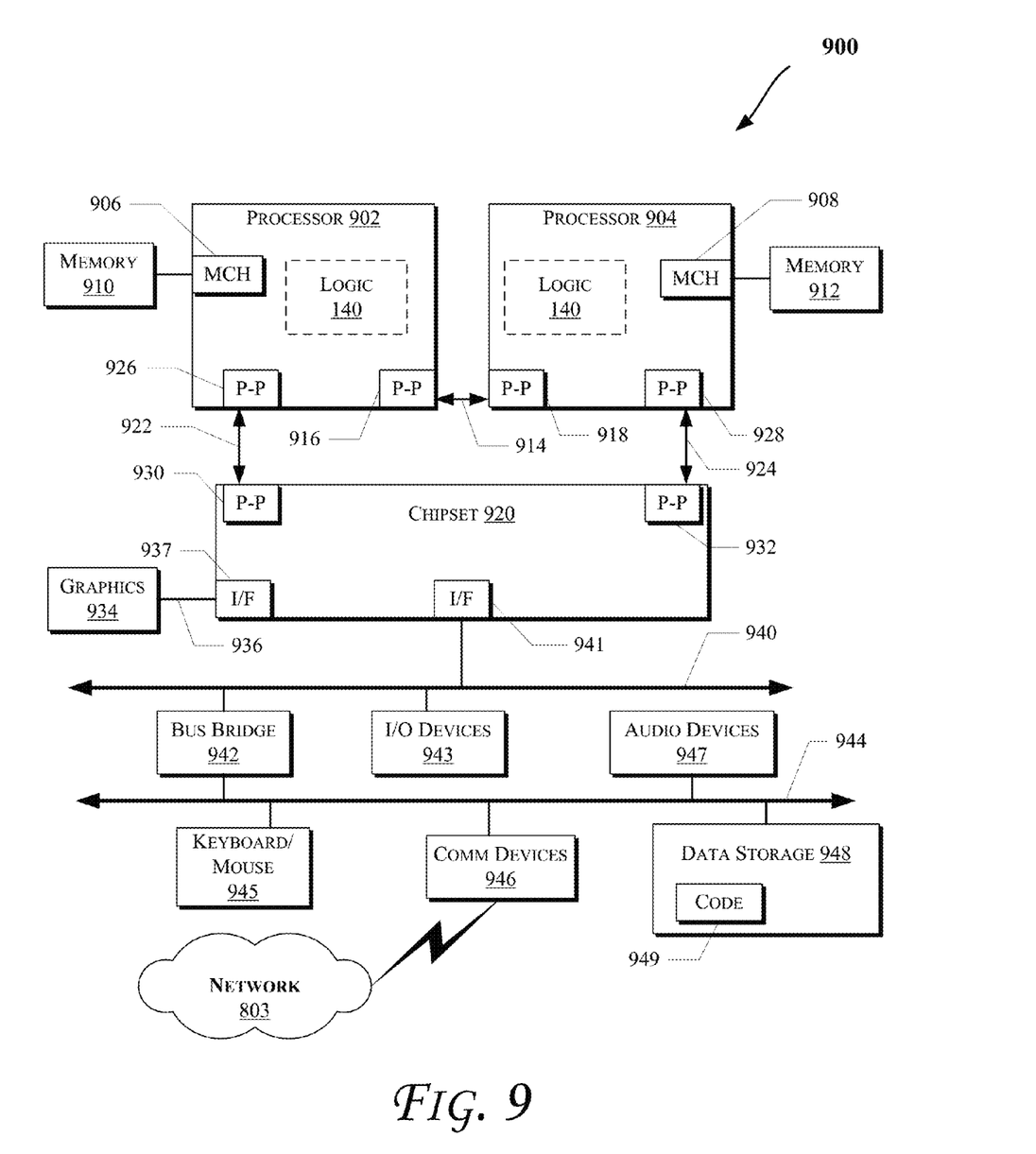

FIG. 9 illustrates a computing system 900 that is arranged in a point-to-point (PtP) configuration, according to an embodiment. In particular, FIG. 9 shows a system where processors, memory, and input/output devices are interconnected by a number of point-to-point interfaces. The operations discussed with reference to FIGS. 1-8 may be performed by one or more components of the system 900. For example, a voltage regulator (such as VR 130 of FIG. 1) may regulate voltage supplied to one or more components of FIG. 9 at the direction of logic 140.

As illustrated in FIG. 9, the system 900 may include several processors, of which only two, processors 902 and 904 are shown for clarity. The processors 902 and 904 may each include a local memory controller hub (MCH) 906 and 908 to enable communication with memories 910 and 912. The memories 910 and/or 912 may store various data such as those discussed with reference to the memory 812 of FIG. 8. Also, the processors 902 and 904 may include one or more of the cores 106, logic 140, and/or sensor(s) 150 of FIG. 1.

In an embodiment, the processors 902 and 904 may be one of the processors 802 discussed with reference to FIG. 8. The processors 902 and 904 may exchange data via a point-to-point (PtP) interface 914 using PtP interface circuits 916 and 918, respectively. Also, the processors 902 and 904 may each exchange data with a chipset 920 via individual PtP interfaces 922 and 924 using point-to-point interface circuits 926, 928, 930, and 932. The chipset 920 may further exchange data with a high-performance graphics circuit 934 via a high-performance graphics interface 936, e.g., using a PtP interface circuit 937.

In at least one embodiment, one or more operations discussed with reference to FIGS. 1-8 may be performed by the processors 902 or 904 and/or other components of the system 900 such as those communicating via a bus 940. Other embodiments, however, may exist in other circuits, logic units, or devices within the system 900 of FIG. 9. Furthermore, some embodiments may be distributed throughout several circuits, logic units, or devices illustrated in FIG. 9.

Chipset 920 may communicate with the bus 940 using a PtP interface circuit 941. The bus 940 may have one or more devices that communicate with it, such as a bus bridge 942 and I/O devices 943. Via a bus 944, the bus bridge 942 may communicate with other devices such as a keyboard/mouse 945, communication devices 946 (such as modems, network interface devices, or other communication devices that may communicate with the computer network 803), audio I/O device, and/or a data storage device 948. The data storage device 948 may store code 949 that may be executed by the processors 902 and/or 904.

Figure 10:
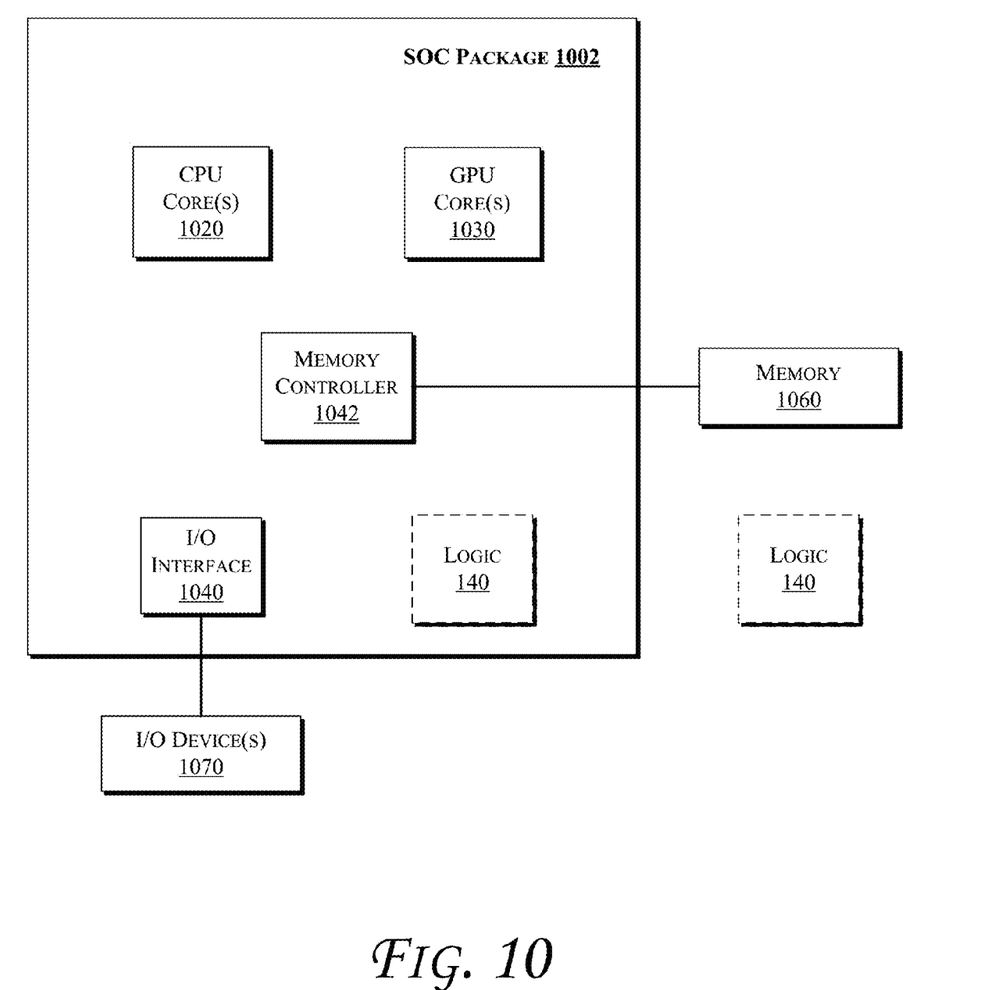

In some embodiments, one or more of the components discussed herein can be embodied as a System On Chip (SOC) device. FIG. 10 illustrates a block diagram of an SOC package in accordance with an embodiment. As illustrated in FIG. 10, SOC 1002 includes one or more Central Processing Unit (CPU) cores 1020, one or more Graphics Processor Unit (GPU) cores 1030, an Input/Output (I/O) interface 1040, and a memory controller 1042. Various components of the SOC package 1002 may be coupled to an interconnect or bus such as discussed herein with reference to the other figures. Also, the SOC package 1002 may include more or less components, such as those discussed herein with reference to the other figures. Further, each component of the SOC package 1020 may include one or more other components, e.g., as discussed with reference to the other figures herein. In one embodiment, SOC package 1002 (and its components) is provided on one or more Integrated Circuit (IC) die, e.g., which are packaged into a single semiconductor device.

As illustrated in FIG. 10, SOC package 1002 is coupled to a memory 1060 (which may be similar to or the same as memory discussed herein with reference to the other figures) via the memory controller 1042. In an embodiment, the memory 1060 (or a portion of it) can be integrated on the SOC package 1002.

The I/O interface 1040 may be coupled to one or more I/O devices 1070, e.g., via an interconnect and/or bus such as discussed herein with reference to other figures. I/O device(s) 1070 may include one or more of a keyboard, a mouse, a touchpad, a display, an image/video capture device (such as a camera or camcorder/video recorder), a touch screen, a speaker, or the like. Furthermore, SOC package 1002 may include/integrate the logic 140 in an embodiment. Alternatively, the logic 140 may be provided outside of the SOC package 1002 (i.e., as a discrete logic).

The following examples pertain to further embodiments. Example 1 includes an apparatus comprising: logic, at least a portion of which is in hardware, to cause modification to a slew rate of a processor based on at least a charge level of a battery pack, wherein the battery pack is to supply power to the processor. Example 2 includes the apparatus of example 1, wherein the slew rate is to be determined based on comparison of a determined battery power level slew rate and a threshold slew rate. Example 3 includes the apparatus of example 2, wherein the determined battery power level slew rate is to be determined based on a minimum input voltage and a maximum output current of the battery pack. Example 4 includes the apparatus of example 1, further comprising one or more sensors to detect variations in one or more of: temperature, operating frequency, operating voltage, and power consumption. Example 5 includes the apparatus of example 1, where the processor is to comprise one or more processor cores. Example 6 includes the apparatus of example 1, wherein one or more of: the logic, the processor, and memory are on a single integrated circuit. Example 7 includes the apparatus of example 1, wherein the battery pack is to supply power to the logic.

Example 8 includes a method comprising: causing modification to a slew rate of a processor based on at least a charge level of a battery pack, wherein the battery pack is to supply power to the processor. Example 9 includes the method of example 8, further comprising determining the slew rate based on comparison of a determined battery power level slew rate and a threshold slew rate. Example 10 includes the method of example 9, further comprising determining the battery power level slew rate based on a minimum input voltage and a maximum output current of the battery pack. Example 11 includes the method of example 8, further comprising one or more sensors detecting variations in one or more of: temperature, operating frequency, operating voltage, and power consumption.

Example 12 includes a computer-readable medium comprising one or more instructions that when executed on a processor configure the processor to perform one or more operations to: cause modification to a slew rate of a processor based on at least a charge level of a battery pack, wherein the battery pack is to supply power to the processor. Example 13 includes the computer-readable medium of example 12, further comprising one or more instructions that when executed on the processor configure the processor to perform one or more operations to determine the slew rate based on comparison of a determined battery power level slew rate and a threshold slew rate. Example 14 includes the computer-readable medium of example 13, further comprising one or more instructions that when executed on the processor configure the processor to perform one or more operations to determine the battery power level slew rate based on a minimum input voltage and a maximum output current of the battery pack. Example 15 includes the computer-readable medium of example 12, further comprising one or more instructions that when executed on the processor configure the processor to perform one or more operations to cause one or more sensors to detect variations in one or more of: temperature, operating frequency, operating voltage, and power consumption.

Example 16 includes a system comprising: a processor; and logic, at least a portion of which is in hardware, to cause modification to a slew rate of the processor based on at least a charge level of a battery pack, wherein the battery pack is to supply power to the processor. Example 17 includes the system of example 16, wherein the slew rate is to be determined based on comparison of a determined battery power level slew rate and a threshold slew rate. Example 18 includes the system of example 17, wherein the determined battery power level slew rate is to be determined based on a minimum input voltage and a maximum output current of the battery pack. Example 19 includes the system of example 16, further comprising one or more sensors to detect variations in one or more of: temperature, operating frequency, operating voltage, and power consumption. Example 20 includes the system of example 16, where the processor is to comprise one or more processor cores. Example 21 includes the system of example 16, wherein one or more of: the logic, the processor, and memory are on a single integrated circuit. Example 22 includes the system of example 16, wherein the battery pack is to supply power to the logic. Example 23 includes the system of example 16, further comprising a display device, coupled to the processor, to display an image.

Example 24 includes a computer-readable medium comprising one or more instructions that when executed on a processor configure the processor to perform one or more operations of any one of examples 8 to 11.

Example 25 includes an apparatus comprising means to perform a method as set forth in any one of examples 8 to 11.

Example 26 includes an apparatus comprising means to perform a method as set forth in any preceding example.

Example 27 includes a machine-readable storage including machine-readable instructions, when executed, to implement a method or realize an apparatus as set forth in any preceding claim.

In various embodiments, the operations discussed herein, e.g., with reference to FIGS. 1-10, may be implemented as hardware (e.g., logic circuitry), software, firmware, or combinations thereof, which may be provided as a computer program product, for example, including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-10.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, at least a portion of which is in hardware, to cause modification to an output of a voltage regulator or a power source, coupled to a processor, based on at least a charge level of a battery pack,
   wherein the battery pack is to supply power to the processor through the voltage regulator or the power source, wherein a level of the modification is to be determined based at least in part on a maximum current consumption by the processor and a maximum power level that the battery pack is capable to deliver while the output of the voltage regulator or the power source is above a minimum system voltage level, wherein the maximum power level of the battery pack is to be determined on a periodic basis.

2. The apparatus of claim 1, wherein a slew rate of the processor is to be determined based on comparison of a determined battery power level slew rate and a threshold slew rate.

3. The apparatus of claim 2, wherein the determined battery power level slew rate is to be determined based on a minimum input voltage and a maximum output current of the battery pack.

4. The apparatus of claim 1, further comprising one or more sensors to detect variations in one or more of: temperature, operating frequency, operating voltage, and power consumption.

5. The apparatus of claim 1, where the processor is to comprise one or more processor cores.

6. The apparatus of claim 1, wherein one or more of: the logic, the processor, and memory are on a single integrated circuit.

7. The apparatus of claim 1, wherein the battery pack is to supply power to the logic.

8. A method comprising:
   causing modification to an output of a voltage regulator or a power source, coupled to a processor, based on at least a charge level of a battery pack,
   wherein the battery pack is to supply power to the processor through the voltage regulator or the power source, wherein a level of the modification is determined based at least in part on a maximum current consumption by the processor and a maximum power level that the battery pack is capable to deliver while the output of the voltage regulator or the power source is above a minimum system voltage level, wherein the maximum power level of the battery pack is determined on a periodic basis.

9. The method of claim 8, further comprising determining a slew of the processor rate based on comparison of a determined battery power level slew rate and a threshold slew rate.

10. The method of claim 9, further comprising determining the battery power level slew rate based on a minimum input voltage and a maximum output current of the battery pack.

11. The method of claim 8, further comprising one or more sensors detecting variations in one or more of: temperature, operating frequency, operating voltage, and power consumption.

12. A non-transitory computer-readable medium comprising one or more instructions that when executed on a processor configure the processor to perform one or more operations to:
   cause modification to an output of a voltage regulator or a power source, coupled to a processor, based on at least a charge level of a battery pack,
   wherein the battery pack is to supply power to the processor through the voltage regulator or the power source, wherein a level of the modification is to be determined based at least in part on a maximum current consumption by the processor and a maximum power level that the battery pack is capable to deliver while the output of the voltage regulator or the power source is above a minimum system voltage level, wherein the maximum power level of the battery pack is to be determined on a periodic basis.

13. The non-transitory computer-readable medium of claim 12, further comprising one or more instructions that when executed on the processor configure the processor to perform one or more operations to determine a slew rate of the processor based on comparison of a determined battery power level slew rate and a threshold slew rate.

14. The non-transitory computer-readable medium of claim 13, further comprising one or more instructions that when executed on the processor configure the processor to perform one or more operations to determine the battery power level slew rate based on a minimum input voltage and a maximum output current of the battery pack.

15. The non-transitory computer-readable medium of claim 12, further comprising one or more instructions that when executed on the processor configure the processor to perform one or more operations to cause one or more sensors to detect variations in one or more of: temperature, operating frequency, operating voltage, and power consumption.

16. A system comprising:
   a processor; and
   logic, at least a portion of which is in hardware, to cause modification to an output of a voltage regulator or a power source, coupled to the processor, based on at least a charge level of a battery pack,
wherein the battery pack is to supply power to the processor through the voltage regulator or the power source, wherein a level of the modification is to be determined based at least in part on a maximum current consumption by the processor and a maximum power level that the battery pack is capable to deliver while the output of the voltage regulator or the power source is above a minimum system voltage level, wherein the maximum power level of the battery pack is to be determined on a periodic basis.

17. The system of claim 16, wherein a slew rate of the processor is to be determined based on comparison of a determined battery power level slew rate and a threshold slew rate.

18. The system of claim 17, wherein the determined battery power level slew rate is to be determined based on a minimum input voltage and a maximum output current of the battery pack.

19. The system of claim 16, further comprising one or more sensors to detect variations in one or more of: temperature, operating frequency, operating voltage, and power consumption.

20. The system of claim 16, where the processor is to comprise one or more processor cores.

21. The system of claim 16, wherein one or more of: the logic, the processor, and memory are on a single integrated circuit.

22. The system of claim 16, wherein the battery pack is to supply power to the logic.

23. The system of claim 16, further comprising a display device, coupled to the processor, to display an image.

24. The apparatus of claim 1, wherein the periodic basis is to comprise a normal frequency, wherein the maximum power level of the battery pack is to be determined less frequently in an off mode and more frequently as determined by the logic.

* * * * *